United States Patent
Kuwabara et al.

(10) Patent No.: US 9,428,031 B2
(45) Date of Patent: Aug. 30, 2016

(54) VEHICLE-USE PIVOTALLY-SUPPORTING PORTION STRUCTURE AND VEHICLE

(71) Applicant: HONDA MOTOR CO., LTD., Tokyo (JP)

(72) Inventors: Naoki Kuwabara, Wako (JP); Hiroaki Tomita, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/600,520

(22) Filed: Jan. 20, 2015

(65) Prior Publication Data

US 2015/0210139 A1    Jul. 30, 2015

(30) Foreign Application Priority Data

Jan. 24, 2014 (JP) ................................. 2014-011621

(51) Int. Cl.
| | |
|---|---|
| B60G 7/00 | (2006.01) |
| B60G 21/055 | (2006.01) |
| F16J 15/32 | (2016.01) |
| B60G 3/20 | (2006.01) |
| B60T 17/04 | (2006.01) |

(52) U.S. Cl.
CPC ............ B60G 21/055 (2013.01); B60G 3/20 (2013.01); B60G 7/001 (2013.01); B60G 7/008 (2013.01); B60T 17/04 (2013.01); F16J 15/3204 (2013.01); B60G 2200/144 (2013.01); B60G 2204/148 (2013.01); B60G 2204/418 (2013.01); B60G 2300/13 (2013.01)

(58) Field of Classification Search
CPC .. B60G 21/055; B60G 21/7008; B60G 3/20; B60G 7/001; B60G 2200/144; B60G 2204/148; B60G 2300/13; B60G 2204/418; B60T 17/04; F16J 15/32; F16J 15/3204
See application file for complete search history.

(56) References Cited

U.S. PATENT DOCUMENTS

| | | | | | |
|---|---|---|---|---|---|
| 2,351,291 | A | * | 6/1944 | Ross ..................... | B60G 3/20 267/254 |
| 2,890,893 | A | * | 6/1959 | Laukhuff ............... | B62D 17/00 280/86.756 |
| 3,000,657 | A | * | 9/1961 | Boschi .................. | B60G 7/00 267/248 |
| 4,753,455 | A | * | 6/1988 | Murakami ............. | B60G 3/265 280/124.138 |
| 4,883,287 | A | * | 11/1989 | Murakami ............. | B60G 3/265 280/124.135 |
| 4,934,729 | A | * | 6/1990 | Murata .................. | B60G 3/265 280/124.136 |
| 5,069,431 | A | * | 12/1991 | Kakimoto .............. | B60G 7/02 267/141 |

(Continued)

FOREIGN PATENT DOCUMENTS

JP    2008-179323    8/2008

*Primary Examiner* — Paul N Dickson
*Assistant Examiner* — Timothy Wilhelm
(74) *Attorney, Agent, or Firm* — Rankin, Hill & Clark LLP (57) ABSTRACT

A vehicle-use pivotally-supporting portion structure includes a cylindrical upper pivotally-supporting portion; a tubular bushing mounted on a radially inner side of an end portion of the upper pivotally-supporting portion; and a sealing member mounted on a radially outer side of the end portion of the upper pivotally-supporting portion. A flange portion, which extends outward in a radial direction and is brought into contact with a distal end of the upper pivotally-supporting portion, is formed on an end portion of the tubular bushing, and an outer diameter of the flange portion is larger than an outer diameter of the end portion of the upper pivotally-supporting portion.

10 Claims, 8 Drawing Sheets

(56) References Cited

U.S. PATENT DOCUMENTS

| | | | | |
|---|---|---|---|---|
| 5,261,748 A * | 11/1993 | Kameda | ............ | F16F 1/38 267/141 |
| 5,538,274 A * | 7/1996 | Schmitz | ............ | B60G 3/20 267/141.2 |
| 5,593,233 A * | 1/1997 | Kammel | ............ | B60G 7/02 384/222 |
| 5,820,150 A * | 10/1998 | Archer | ............ | B60G 3/20 267/141.2 |
| 5,873,587 A * | 2/1999 | Kawabe | ............ | B60G 3/20 280/124.135 |
| 6,007,072 A * | 12/1999 | Yoon | ............ | B60G 7/006 267/140.12 |
| 6,113,118 A * | 9/2000 | Zebolsky | ............ | B62D 7/18 280/93.512 |
| 6,176,501 B1 * | 1/2001 | Bartolone | ............ | B60G 3/20 280/86.756 |
| 6,435,757 B1 * | 8/2002 | Casella | ............ | B60G 7/02 267/140.12 |
| 7,325,820 B2 * | 2/2008 | Allen | ............ | B60G 3/18 280/124.109 |
| 7,360,756 B2 * | 4/2008 | Urquidi | ............ | B60G 7/02 267/140.14 |
| 7,431,315 B2 * | 10/2008 | Jargowsky | ............ | B60G 3/202 280/124.128 |
| 7,661,687 B2 * | 2/2010 | Seki | ............ | B60G 3/24 180/373 |
| 7,744,104 B2 * | 6/2010 | Kuwabara | ............ | B60G 3/20 280/124.134 |
| 2007/0085295 A1 * | 4/2007 | Johnson | ............ | B60G 3/20 280/124.152 |
| 2014/0103627 A1 * | 4/2014 | Deckard | ............ | F16B 7/18 280/807 |

* cited by examiner

VEHICLE-USE PIVOTALLY-SUPPORTING PORTION STRUCTURE AND VEHICLE

BACKGROUND OF THE INVENTION

1. Field of the Invention

The present invention relates to a vehicle-use pivotally-supporting portion structure and a vehicle.

2. Description of Related Art

Conventionally, as a pivotally-supporting portion structure for suspension, there is known a structure wherein a tubular bushing is inserted into the inside of an end portion of a cylindrical portion to be pivotally supported, and the portion to be pivotally supported is fastened to a support portion by a bolt that constitutes a connecting shaft in a state where an end portion of the portion to be pivotally supported is covered with an annular sealing member and a plate member that holds the sealing member (see JP-A-2008-179323, for example).

However, in the above-mentioned conventional structure, a sealing member is merely resiliently fitted on an end portion of a portion to be pivotally supported. Hence, it may be the case that other parts are brought into contact with the sealing member so that the sealing member is removed at the time of assembling a vehicle. This results in increased labor for assembly of the vehicle. Furthermore, when a structure for engaging the sealing member is newly adopted, the pivotally-supporting portion structure becomes complicated and, thus, may increase the costs.

SUMMARY OF THE INVENTION

Accordingly, it is an object of the invention to ease the assembly of parts around a portion to be pivotally supported without pushing up a cost in the manufacture of a vehicle-use pivotally-supporting portion structure and a vehicle where a sealing member is mounted and supported on an end portion of a portion to be pivotally supported.

In accordance with the present invention, a vehicle-use pivotally-supporting portion structure includes a cylindrical portion to be pivotally supported, a tubular bushing mounted on a radially inner side of an end portion of the portion to be pivotally supported, and a sealing member mounted on a radially outer side of the end portion of the portion to be pivotally supported. A flange portion, which extends outward in a radial direction and is brought into contact with a distal end of the portion to be pivotally supported, is formed on an end portion of the tubular bushing. An outer diameter of the flange portion is larger than an outer diameter of the end portion of the portion to be pivotally supported.

Accordingly, the sealing member mounted on the end portion of the portion to be pivotally supported is caught by a stepped portion formed by the flange portion so that the sealing member is minimally removed from the portion to be pivotally supported. Therefore, by making or setting the diameter of the flange portion larger than the diameter of the end portion of the portion to be pivotally supported, a tendency that the sealing member is easily removed can be suppressed. Hence, it is possible to enhance assembling property of parts around the portion to be pivotally supported without increasing the manufacturing cost.

In further accordance with the present invention, the outer diameter of the flange portion is 0.2 to 0.8 mm larger than the outer diameter of the end portion of the portion to be pivotally supported. By setting the tolerance in size of the outer diameter of the flange portion and the tolerance in size of the outer diameter of the end portion of the portion to be pivotally supported to approximately ±0.1 mm, a state where the outer diameter of the flange portion is smaller than the outer diameter of the end portion of the portion to be pivotally supported is minimally generated. Hence, it is possible to ensure catching of the sealing member by forming the stepped portion on the end portion of the portion to be pivotally supported by the flange portion. Further, by suppressing the diameter of the flange portion from becoming excessively large, it is possible to ensure the ease in mounting of the sealing member.

In further accordance with the present invention, a vehicle that adopts the vehicle-use pivotally-supporting portion structure includes left and right suspension arms, which support left and right wheels, respectively, and are swingably supported on a vehicle body frame, and a cushion unit, which extends between the left and right suspension arms and the vehicle body frame. Connecting portions of the left and right suspension arms to the vehicle body frame and a connecting portion of the cushion unit to the vehicle body frame are arranged on an approximately same straight line as viewed in a plan view. In addition to the above-mentioned manner of operation and advantageous effects, the arm support portion, the cushion support portion and the periphery of these portions of the vehicle body frame can be efficiently reinforced by the reinforcing structure disposed at the same position as these portions in the longitudinal direction.

In further accordance with the present invention, the connecting portions of the suspension arms support a front side of the suspension arms, and the connecting portion of the cushion unit is arranged on the front side of the suspension arms in the same manner as the connecting portions of the suspension arms, and the suspension arms, respectively, have a sub arm that projects more frontward than the cushion unit projects. Accordingly, even in the structure where the cushion unit is disposed on a front side of the suspension arm, by disposing the sub arm which projects more frontward than the cushion unit projects, pebbles or the like scattered up from a road surface minimally hit the cushion unit.

In further accordance with the present invention, the vehicle includes a stabilizer that extends between the left and right suspension arms above a cross member of the vehicle body frame, and a brake line that reaches the left and right wheels is arranged to pass between the cross member and the stabilizer. Accordingly, it is possible to suppress a heavy object such as the drive device from coming into contact with a brake line at the time of assembling a vehicle.

BRIEF DESCRIPTION OF THE DRAWINGS

These and further features of the invention will be apparent with reference to the following description and drawings, wherein.

DETAILED DESCRIPTION OF THE PREFERRED EMBODIMENT

Hereinafter, an embodiment of the invention is explained by reference to drawings. In the explanation made hereinafter, the directions of frontward, rearward, leftward, rightward and the like are equal to the directions of a vehicle explained hereinafter unless otherwise specified. At proper positions of the drawings used for the explanation made hereinafter, an arrow FR indicating a front side of the vehicle, an arrow LH indicating a left side of the vehicle, and an arrow UP indicating an upper side of the vehicle are described. In the drawings, a line CL indicates a center line in the lateral direction of a vehicle body.

Figure 1:
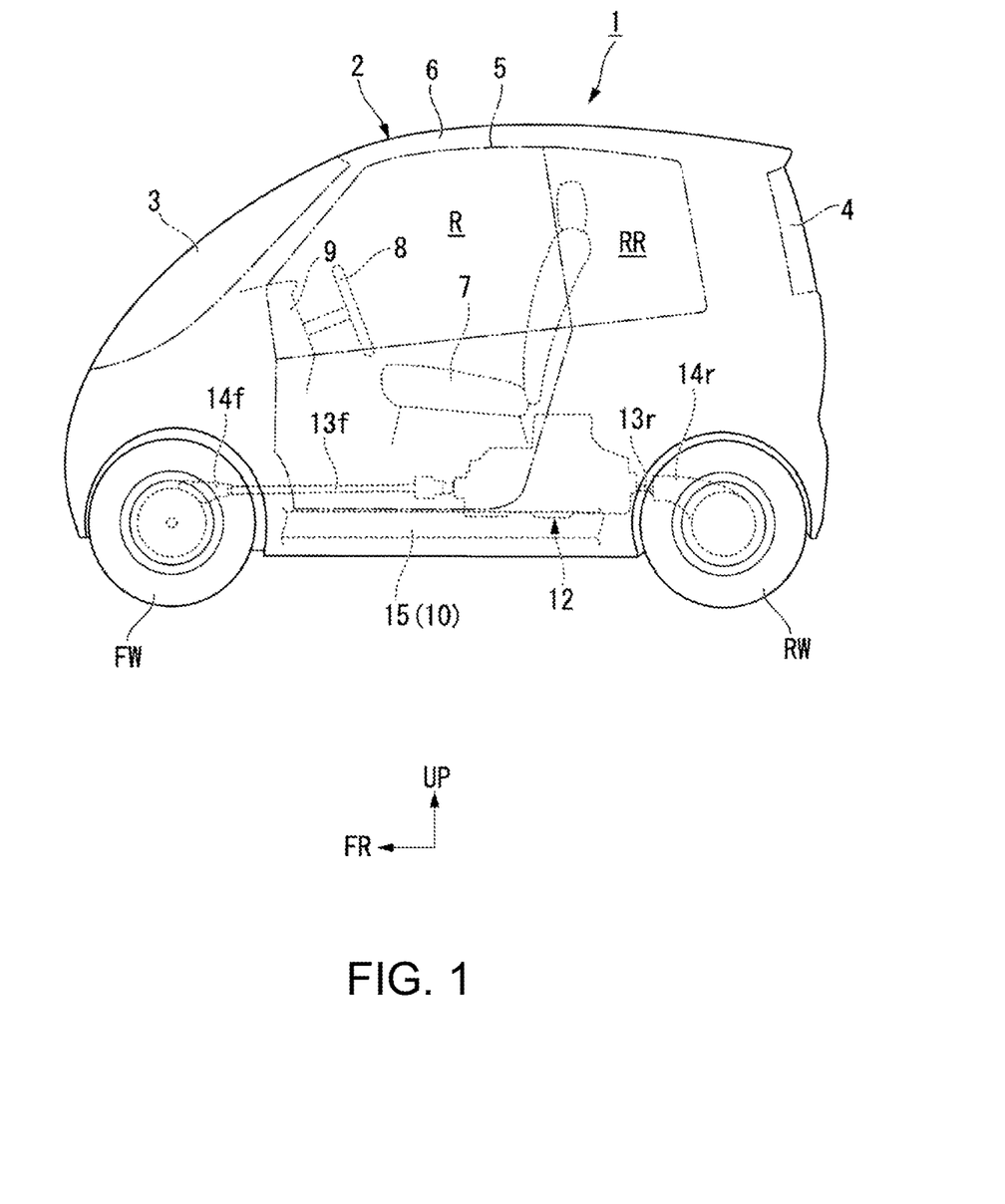
FIG. 1 is a left side view of a vehicle according to an embodiment of the invention.

A vehicle 1 shown in FIG. 1 is a relatively-small-sized MUV (Multi•Utility•Vehicle). The vehicle 1 includes front wheels FW, which constitute left and right wheels to be steered on left and right sides, respectively, of a front portion of a vehicle body, and includes rear wheels RW, which constitute left and right drive wheels on left and right sides, respectively, of a rear portion of the vehicle body.

The vehicle 1 has an upper body 2 that defines a riding space R. The upper body 2 includes a wind glass 3 and a rear glass 4 that are arranged on a front side and a rear side of the riding space R, respectively, doors 5 that cover left and right sides of the riding space R, a roof 6 that covers the riding space R from above and the like. A portion of the upper body 2 excluding window portions made of glass is formed of a steel plate or a synthetic resin plate.

For example, a driver's seat 7 having a seat body and a backrest is arranged at the center of the riding space R in the lateral direction. A steering wheel 8 and a dashboard 9 are arranged on a front portion of the riding space R and in front of the seat 7. A rear space RR, which defines a cargo room or a rear riding space, is formed on a rear portion of the riding space R and behind the seat 7.

The upper body 2 is mounted on a lower vehicle body frame (hereinafter simply referred to as a vehicle body frame) 10, which constitutes a lower portion of the vehicle body. A traveling drive device 12, which is supported on the vehicle body frame 10, is arranged on a rear lower side of the seat 7. The drive device 12 has at least one of either an internal combustion engine or an electric motor as a prime mover, and outputs a drive force of the prime mover to front and rear propeller shafts 13f, 13r. The front and rear propeller shafts 13f, 13r are respectively connected to front and rear differential mechanisms 14f, 14r, which are supported on front and rear sides of the vehicle body frame 10, respectively. Left and right drive shafts (not shown) in the drawing extend from the front and rear differential mechanisms 14f, 14r respectively, and these left and right drive shafts are respectively connected to the left and right front wheels FW and the left and right rear wheels RW.

Figure 6:
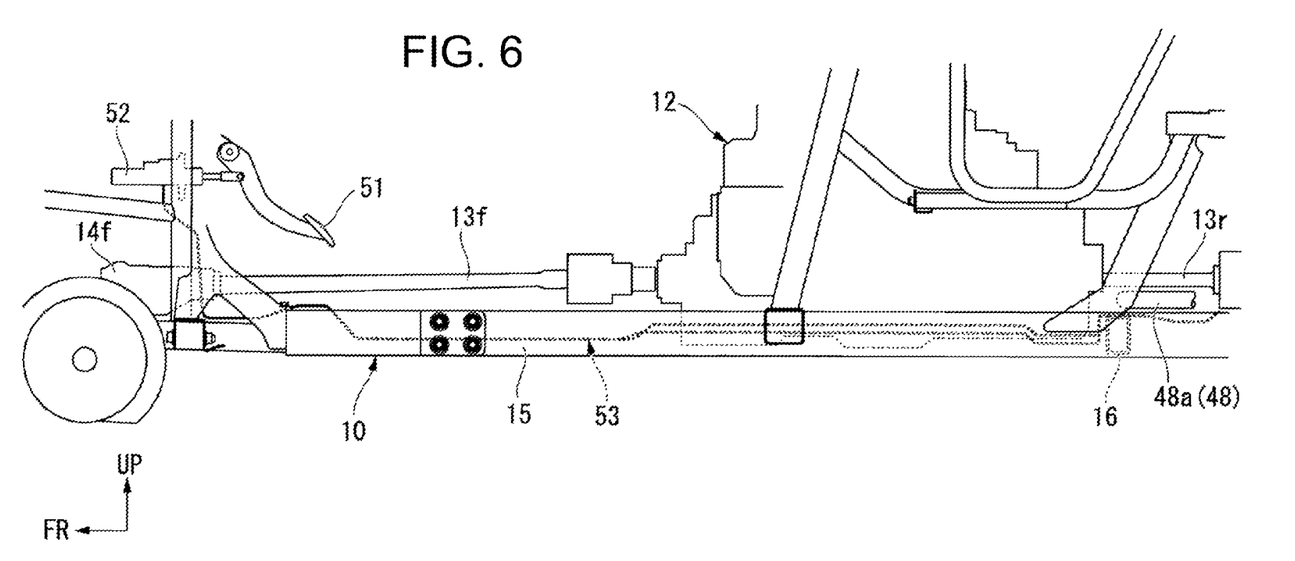
FIG. 6 is a left side view showing the structure including an essential part of a vehicle body frame of the vehicle.
Figure 7:
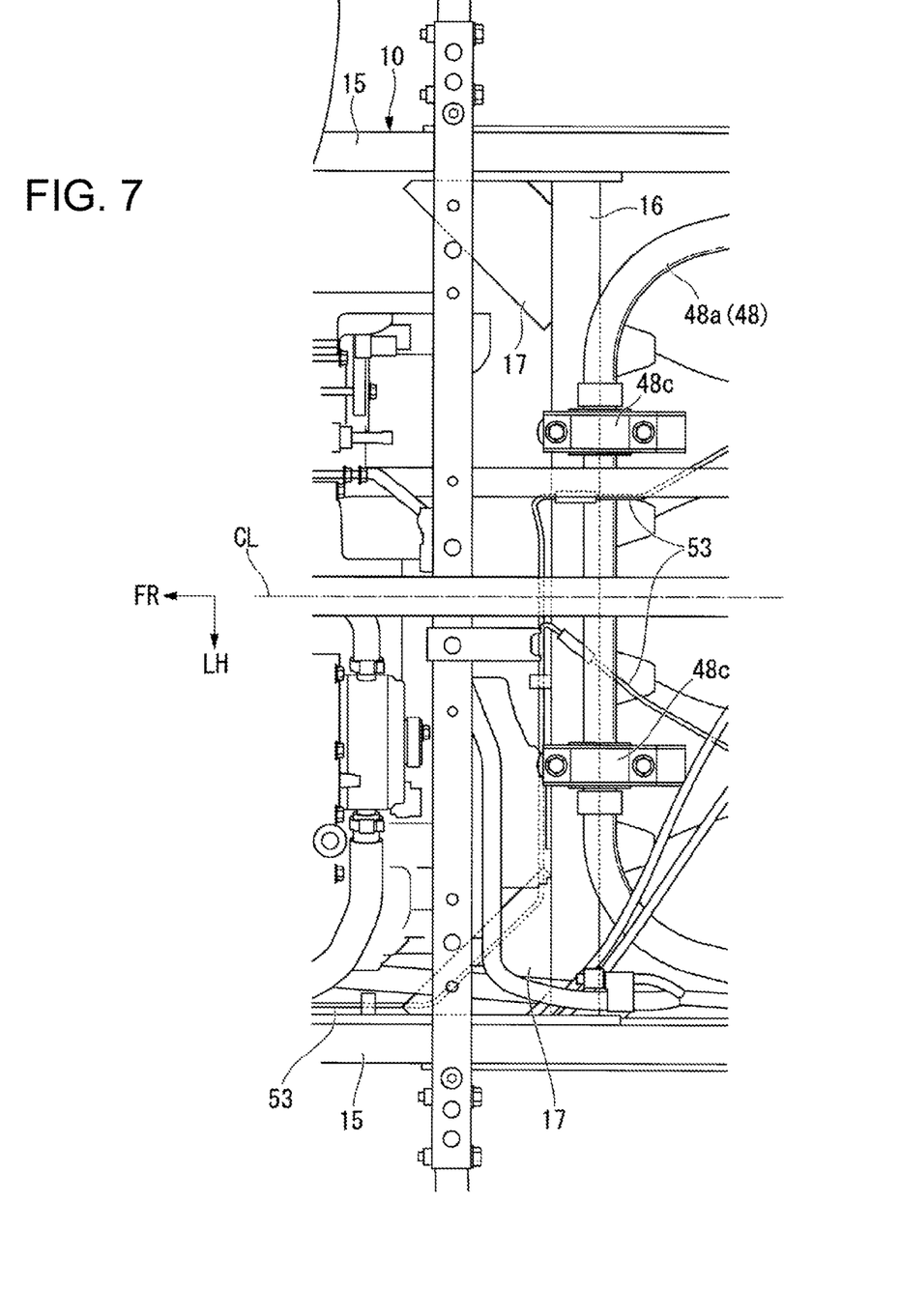
FIG. 7 is a top plan view of an essential part of the vehicle body frame.
Figure 8:
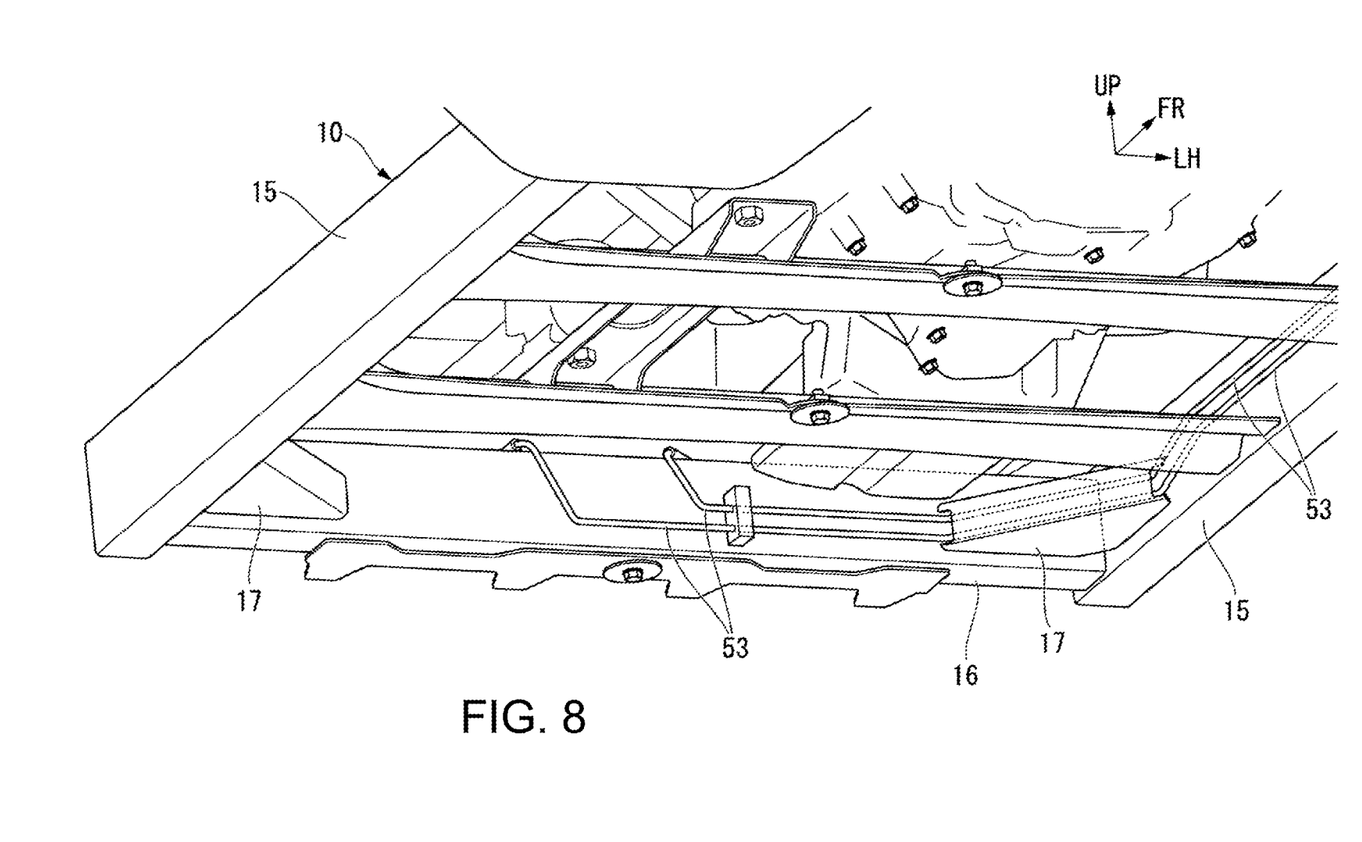
FIG. 8 is a perspective view of the essential part of the vehicle body frame as viewed from a front lower side.

To explain this embodiment also by reference to FIG. 6 to FIG. 8, the vehicle body frame 10 includes left and right side frames 15. The left and right side frames 15 are formed of a rectangular steel pipe, for example, and extend in the longitudinal direction more inside in the vehicle width direction (lateral direction) compared to a side sill of the upper body 2. The left and right side frames 15 are connected to each other by way of a plurality of cross frames that extend in the lateral direction. In this embodiment, only a rear lower cross frame that extends between rear portions of the left and right side frames 15 is shown in the drawing by symbol 16.

The rear lower cross frame 16 has a longitudinally-elongated rectangular cross-sectional shape and extends in the lateral direction. Gussets 17 having a triangular shape as viewed in a plan view are fixedly mounted between front surfaces of left and right end portions of the rear lower cross frame 16 and inner surfaces of the left and right side frames 15, respectively.

The left and right front wheels FW are suspended from a front portion of the vehicle body frame 10 by way of an independent-suspension-type (double wishbone type) front suspension (not shown in the drawing), and the left and right rear wheels RW are suspended from a rear portion of the vehicle body frame 10 by way of an independent-suspension-type (double wishbone type) rear suspension 20 (see FIG. 2 and FIG. 3) in the same manner as the front wheels FW.

Hereinafter, the structure of the rear suspension 20 is explained by reference to FIG. 2 and FIG. 3. It can be assumed that the front suspension also has the same structure.

The rear suspension 20 includes: left and right upper arms 21 and left and right lower arms 31 respectively having a proximal end side thereof swingably supported on the vehicle body frame 10; left and right knuckles 41 that pivotally supports the rear wheels RW in a state where each knuckle 41 is supported on a distal end side of the upper arm 21 and the lower arm 31; and left and right cushion units 28 each of which extends between the lower arm 31 and the vehicle body frame 10.

The upper arm 21 is formed of: for example, an arm body 22, which is formed by bending a round steel pipe into a U shape that opens inward in the lateral direction as viewed in a top plan view; front and rear upper arm connecting portions 23f, 23r, which are fixedly mounted on inner end portions of front and rear arm portions 21f, 21r of the arm body 22, respectively, while having a cylindrical shape extending along the longitudinal direction; front and rear knuckle upper support brackets 24f, 24r, which are fixedly mounted on outer end portions of the front and rear arm portions 21f, 21r and extend to front and rear sides of an upper pivotally-supporting portion 42 of the knuckle 41, respectively; and a cross plate 25 that connects intermediate portions of the front and rear arm portions 21f, 21r to each other.

The front and rear upper arm connecting portions 23f, 23r are arranged on the same axis, and these front and rear upper arm connecting portions 23f, 23r are connected to the front and rear upper arm support portions 26f, 26r of the vehicle body frame 10 by way of swing shafts, respectively.

The front and rear knuckle upper support brackets 24f, 24r are arranged such that distal end portions respectively formed on distal end plate portions 24fa, 24ra of the front and rear knuckle upper support brackets 24f, 24r orthogonal to the longitudinal direction respectively overlap with front and rear ends of the upper pivotally-supporting portion 42 formed into a cylindrical shape extending along the longitudinal direction above the knuckle 41.

Figure 4:
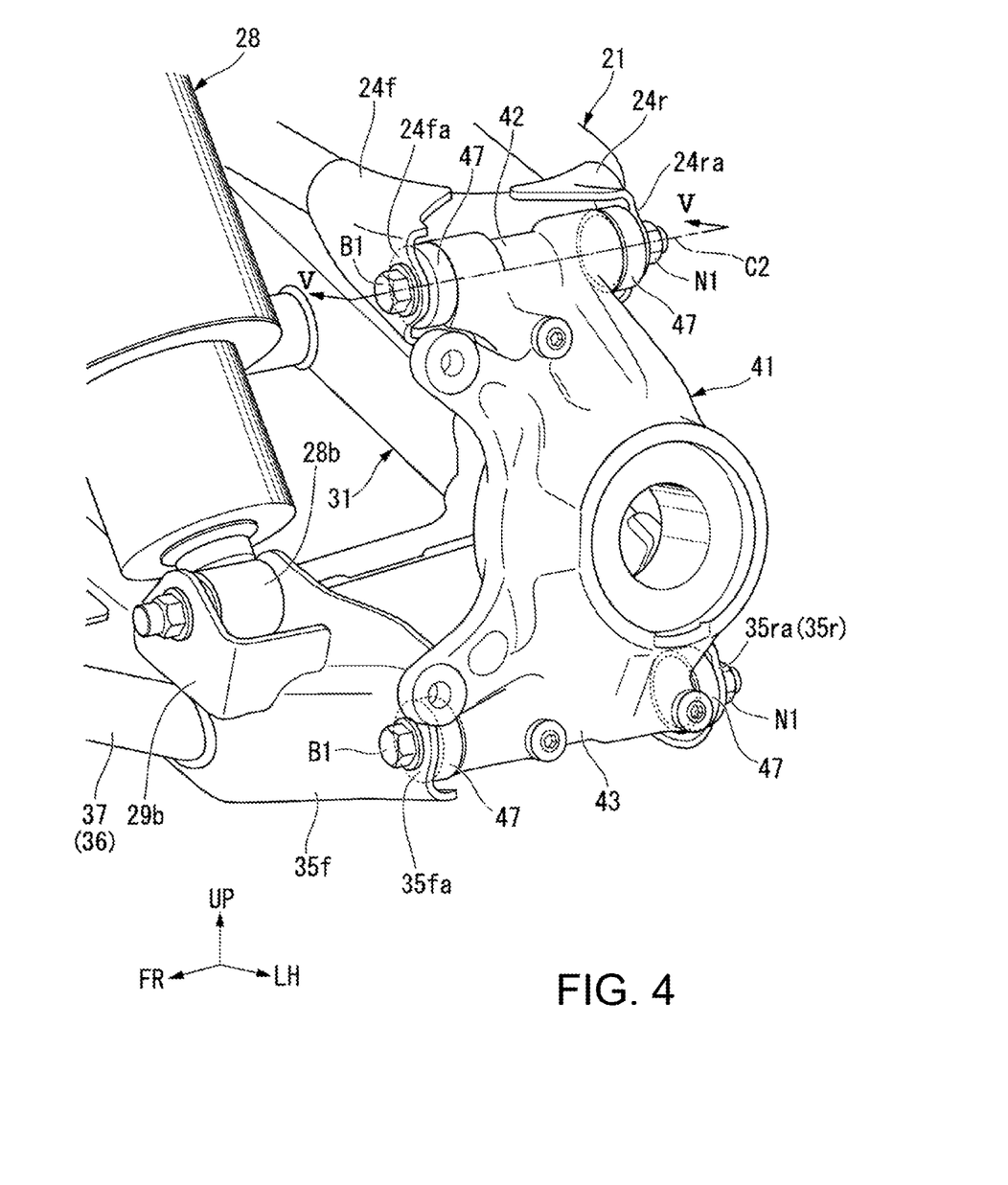
FIG. 4 is a perspective view of a knuckle of the rear suspension and an area around the knuckle as viewed from a front upper side.
Figure 5:
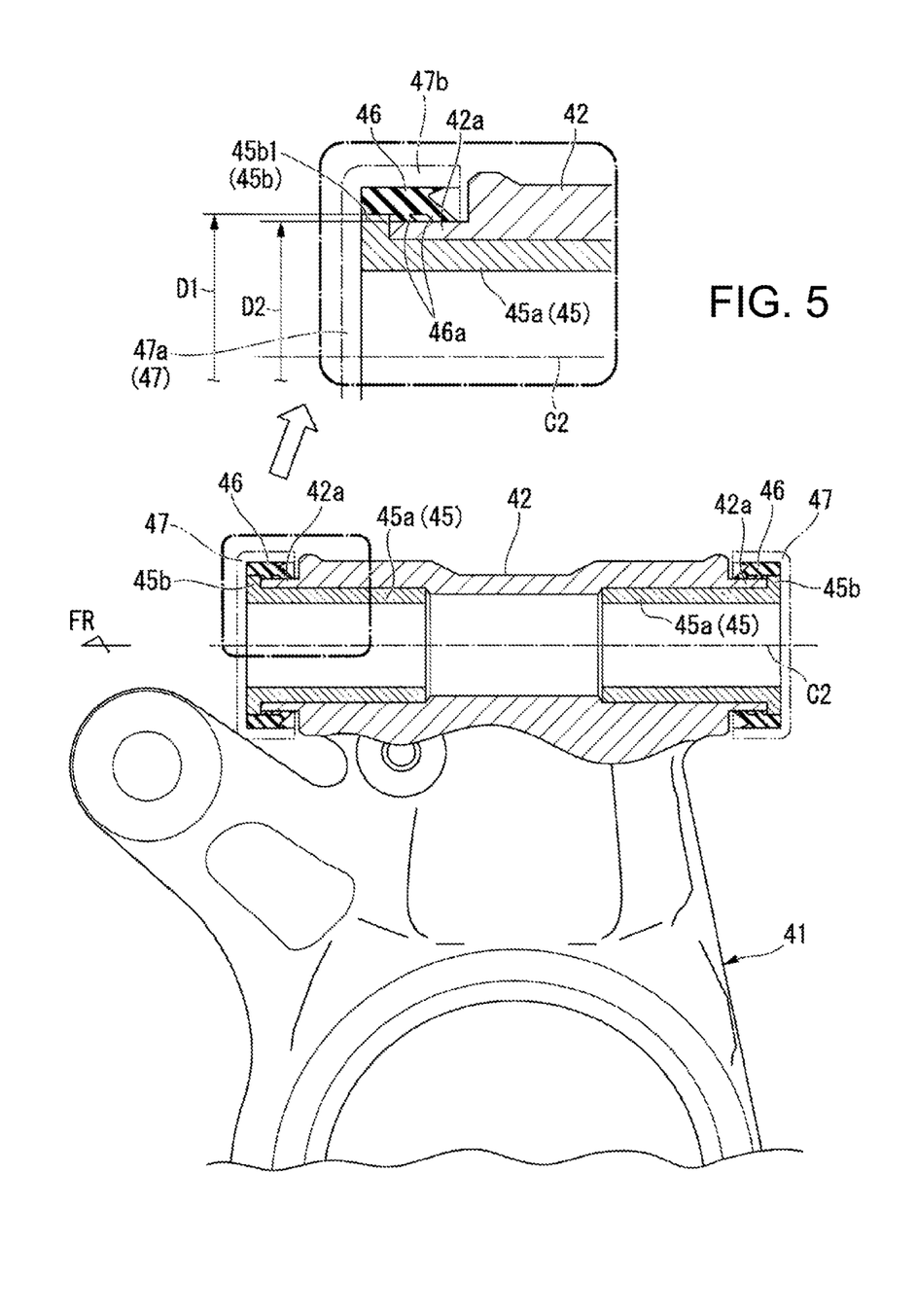
FIG. 5 is a cross-sectional view taken along a line V-V in FIG. 4.

To explain the embodiment also by reference to FIG. 4 and FIG. 5, tubular bushings 45 provided with a flange are fixed by press-fitting into a front portion and a rear portion of the upper pivotally-supporting portion 42, respectively. The tubular bushing 45 has a circular cylindrical body portion 45a, which is fitted into the upper pivotally-supporting portion 42, and a flange portion 45b, which is formed on one end of the body portion 45a and is brought into contact with a distal end of the upper pivotally-supporting portion 42. In the drawing, a line C2 indicates the center axis of the upper pivotally-supporting portion 42.

On the front and rear end portions of the upper pivotally-supporting portion 42, a small-wall-thickness portion 42a having a smaller wall thickness compared to an intermediate portion of the upper pivotally-supporting portion 42 in the longitudinal direction is formed by cutting off outer peripheral sides of the front and rear end portions of the upper pivotally-supporting portion 42. An annular sealing member 46 is mounted on the outer periphery of the small-wall-thickness portion 42a, and a lip 46a on an inner peripheral side of the sealing member 46 is brought into close contact with the outer peripheral surface of the small-wall-thickness portion 42a.

The sealing member 46 is integrally held inside a cover plate 47, which is opened toward the end portion of the upper pivotally-supporting portion 42 and has a shallow bottomed cylindrical shape.

The cover plate 47 has a disc portion 47a in which a bolt insertion hole is formed, and a circular cylindrical portion 47b, which is formed in a raised manner toward the upper pivotally-supporting portion 42 from an outer peripheral edges of the disc portion 47a. The sealing member 46 is integrally and fixedly mounted on an inner peripheral side of the circular cylindrical portion 47b. The cover plates 47 are mounted on the front and rear end portions of the upper pivotally-supporting portion 42 from distal end sides thereof respectively, and an inner surface of the disc portion 47a is brought into contact with an end surface of the flange portion 45b of the tubular bushing 45. In such a state, a pair of lips 46a, which is inclined such that the lips 46a are positioned on a more upper pivotally-supporting portion 42 side as the lips 46a approach an inner peripheral side of the sealing member 46, is brought into close contact with an outer peripheral surface of the small-wall-thickness portion 42a.

The distal end plate portions 24fa, 24ra of the front and rear knuckle upper support brackets 24f, 24r are arranged on outer sides of the disc portions 47a of the cover plates 47 mounted on the front and rear portions of the upper pivotally-supporting portion 42 in an opposedly facing manner. The upper pivotally-supporting portion 42 of the knuckle 41 is swingably supported on a distal end side of the upper arm 21 by inserting a bolt B1, which is elongated along the longitudinal direction from one side to the other side of the front and rear distal end plate portions 24fa, 24ra (from a front side to a rear side in the drawing), by bringing the bolt B1 into slide contact with inner peripheral surfaces of the front and rear tubular bushings 45 while interposing collars or the like between the bolt B1 and the front and rear bushings 45, and by threadedly fastening a nut N1 to threaded portions of the front and rear distal end plate portions 24fa, 24ra that project toward the other side.

Figure 2:
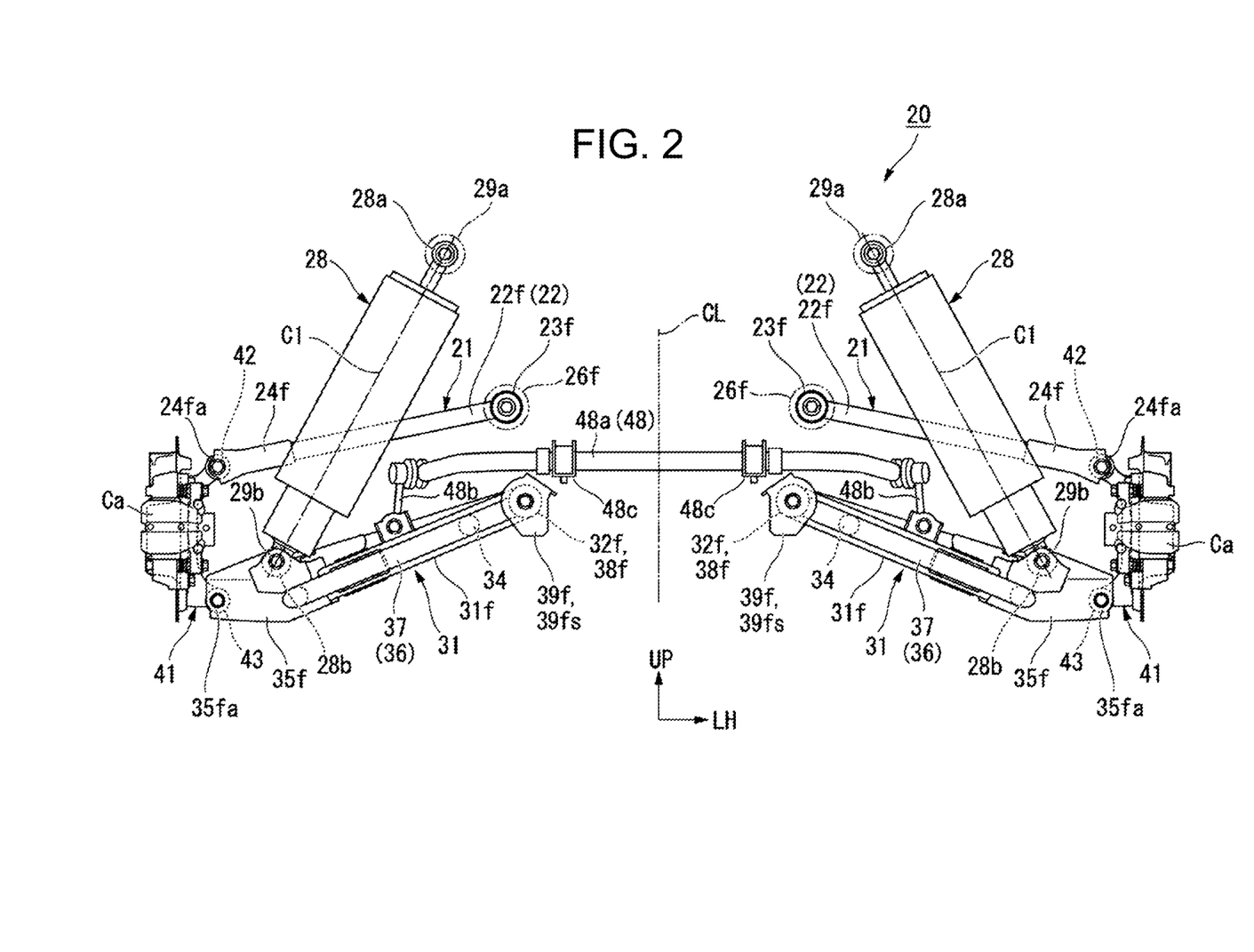
FIG. 2 is a front view of a rear suspension of the vehicle.
Figure 3:
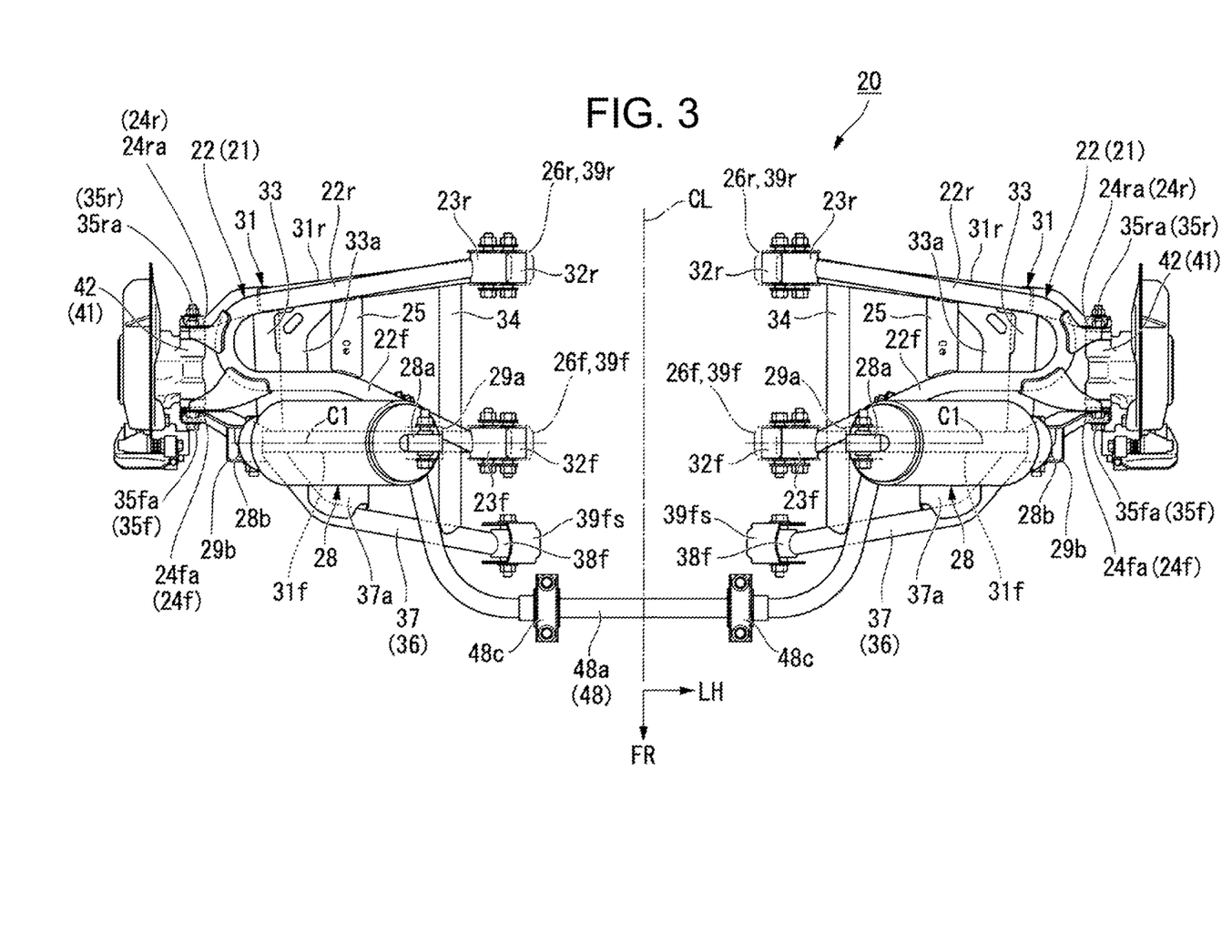
FIG. 3 is a top plan view of the rear suspension.

To explain this embodiment by reference to FIG. 2 and FIG. 3, the lower arm 31 includes: front and rear arm portions 31f, 31r each of which is, for example, formed of a laterally-extending rectangular steel pipe; front and rear lower arm connecting portions 32f, 32r, which are fixedly mounted on distal end portions of the front and rear arm portions 31f, 31r, while having a cylindrical shape extending along the longitudinal direction; an outer cross beam 33, which connects outer portions of the front and rear arm portions 31f, 31r to each other; an inner cross beam 34, which connects inner portions of the front and rear arm portions 31f, 31r to each other; front and rear knuckle lower support brackets 35f, 35r, which are fixedly mounted on outer end portions of the front and rear arm portions 31f, 31r, respectively, and extend to front and rear sides of the lower pivotally-supporting portion 43 of the knuckle 41, respectively; and a front lower sub arm 36, which extends in the lateral direction on a front side of the front arm portion 31f. A cross beam gusset 33a, which extends between the front and rear arm portions 31f, 31r, is fixedly mounted on an inner side of the outer cross beam 33.

The front and rear lower arm connecting portions 32f, 32r are arranged on the same axis, and the front and rear lower arm connecting portions 32f, 32r are connected to the front and rear lower arm support portions 39f, 39r of the vehicle body frame 10 by way of swing shafts, respectively.

The front and rear knuckle lower support brackets 35f, 35r are arranged such that distal end portions respectively formed on distal end plate portions 35fa, 35ra of the front and rear knuckle lower support brackets 35f, 35r orthogonal to the longitudinal direction respectively overlap with front and rear ends of the lower pivotally-supporting portion 43 formed into a cylindrical shape extending along the longitudinal direction below the knuckle 41. A cushion lower support portion 29b, which pivotally supports a lower end portion 28b of the cushion unit 28, is integrally formed on the front knuckle lower support bracket 35f.

The tubular bushings 45 are fixed by press-fitting into the front portion and the rear portion of the lower pivotally-supporting portion 43, respectively. The lower pivotally-supporting portion 43 has substantially the same structure as the upper pivotally-supporting portion 42, and a sealing member 46 and a cover plate 47 are mounted on front and rear end portions of the lower pivotally-supporting portion 43, respectively.

The front lower sub arm 36 has, for example, a sub arm body 37, which is formed by bending a round steel pipe into a shape projecting outward in the lateral direction and frontward as viewed in a top plan view, and a sub lower connecting portion 38f, which is coaxially arranged in front of the front lower arm support portion 39f while having a cylindrical shape extending along the longitudinal direction and is fixedly mounted on an inner end portion of the sub arm body 37. An outer end portion of the sub arm body 37 is joined to an outer front end of the front arm portion 31f. The sub lower connecting portion 38f is supported on a sub arm support portion 39fs of the vehicle body frame 10 by way of a swing shaft.

A front end portion of the inner cross beam 34, which extends frontward while penetrating an inner portion of the front arm, is joined to a rear surface side of an inner portion of the sub arm body 37. A sub arm gusset 37a is fixedly mounted between a rear surface side of an outer portion of the sub arm body 37 including a bent portion and a front surface side of an outer portion of the front arm portion 31f. The bent portion of the sub arm body 37 and an inner portion of the sub arm body 37 on an inner side of the bent portion are positioned more on the front side compared to the cushion unit 28 as viewed in a top plan view. Due to such a structure, it is possible to suppress an approach of a foreign substance that intends to reach the cushion unit 28 from a front lower side of the cushion unit 28 during the traveling of the vehicle 1.

The cushion unit 28 is a known part having a rod-type damper and a coil spring that is wound around the rod-type damper, and the cushion unit 28 extends and contracts along a center axis (stroke axis) C1 thereof, thus acquiring a predetermined buffer action. The cushion unit 28 is arranged such that the stroke axis C1 is inclined inward in the lateral direction as the stroke axis C1 extends upward as viewed in a front view and the stroke axis C1 extends along the lateral direction as viewed in a top plan view.

An upper end portion 28a of the cushion unit 28 is pivotally supported on a cushion upper support portion 29a of the vehicle body frame 10. The upper end portion 28a of the cushion unit 28, the front upper arm connecting portion 23f of the upper arm 21, and the front lower arm connecting portion 32f of the lower arm 31 are arranged at the same positions in the longitudinal direction. In other words, as viewed in FIG. 3, which is a plan view, the upper end portion 28a, the front upper arm connecting portion 23f, and the front lower arm connecting portion 32f are arranged on an extension of the stroke axis C1 of the cushion unit 28. Due to such an arrangement, portions of the vehicle body frame 10 around the cushion upper support portion 29a, the front upper arm support portion 26f, and the front lower arm support portion 39f can be efficiently reinforced by the reinforcing structure that is disposed at the same position as the cushion upper support portion 29a, the front upper arm support portion 26f, and the front lower arm support portion 39f in the longitudinal direction.

As shown in FIG. 5, assuming an outer diameter (diameter) of a flange portion 45b of the tubular bushing 45 as D1 [mm], an outer diameter (diameter) D2 [mm] of the small-wall-thickness portion 42a is set to a value expressed by D1−0.5 [mm]. By setting the relationship between the diameters D1, D2 as described above, even when a tolerance is ±0.1 mm, it is considered that there exists 0.1 mm or more of tolerance between the diameters D1, D2. Accordingly, a stepped portion 45b1 having a projecting shape is formed by the flange portion 45b on an outer peripheral end side of the small-wall-thickness portion 42a.

The sealing members 46 and the cover plates 47 are mounted on the front and rear end portions of the upper pivotally-supporting portion 42 only by the elastic fitting of the sealing members 46 before the knuckle 41 is connected to the upper arm 21. Accordingly, when the upper pivotally-supporting portion 42 is connected to the upper arm 21, there may be a case where the sealing members 46 and the cover plates 47 are removed from the upper pivotally-supporting portion 42 and fall down due to the contact of the cover plates 47 with the knuckle upper support brackets 24f, 24r or the like.

However, by forming the stepped portions 45b1 using the flange portions 45b on the outer peripheral end sides of the small-wall-thickness portions 42a respectively as described above, after the sealing member 46 gets over the stepped portion 45b1 and is fitted on the small-wall-thickness portion 42a, the sealing member 46 and the cover plate 47 are hard to remove from the upper pivotally-supporting portion 42, thus facilitating an operation in connecting the upper pivotally-supporting portion 42 to the upper arm 21.

A fine tolerance with respect to a size of 30 mm or slightly below is ±0.1 in terms of general tolerance prescribed in JIS (Japanese Industrial Standards). By reference to this tolerance, provided that the reference size of the outer diameter of the flange portion 45b is larger than the reference size of the outer diameter of the small-wall-thickness portion 42a by 0.2 mm, even when the outer diameter of the flange portion 45b is biased to a minus side and the outer diameter of the small-wall-thickness portion 42a is biased to a plus side, a state where the outer diameter of the flange portion 45b becomes smaller than the outer diameter of the small-wall-thickness portion 42a minimally occurs, thus ensuring the formation of the stepped portion 45b1 on the outer peripheral end side of the small-wall-thickness portion 42a.

To the contrary, in the case where the reference size of the outer diameter of the flange portion 45b becomes larger than the reference size of the outer diameter of the small-wall-thickness portion 42a by 0.8 mm or more, when the outer diameter of the flange portion 45b is biased to the plus side and the outer diameter of the small-wall-thickness portion 42a is biased to the minus side, the lip 46a of the sealing member 46 barely gets over the flange portion 45b, whereby the mounting of the sealing member 46 on the upper pivotally-supporting portion 42 becomes difficult.

Due to the above-mentioned reasons, it is preferable to set the reference size of the outer diameter of the flange portion 45b larger than the reference size of the outer diameter of the small-wall-thickness portion 42a by 0.2 to 0.8 mm, and more preferably, by 0.4 to 0.6 mm.

To explain this embodiment by reference to FIG. 2 and FIG. 3, the rear suspension 20 includes a stabilizer 48, which suppresses the difference in the vertical movement between the left and right rear wheels RW. The stabilizer 48 has a torsion bar 48a having a gate shape that opens rearward as viewed in a top plan view, and left and right connecting rods 48b, which respectively extend between left and right end portions of the torsion bar 48a and the left and right lower arms 31. The torsion bar 48a has a straight portion extending along the lateral direction, and both left and right side portions of the straight portion are rotatably supported on the rear lower cross frame 16 via holders 48c, respectively.

Upper end portions of the left and right connecting rods 48b are connected to left and right end portions of the torsion bar 48a via ball joints or the like, respectively, and a lower end portion of each connecting rod 48b is connected to an intermediate portion of the front arm of the lower arm 31 via a ball joint or the like. Due to such a structure, when one rear wheel RW is moved in the vertical direction, substantially the same vertical movement is also generated on the other rear wheel RW by way of the torsion bar 48a.

FIG. 6 to FIG. 8 are explanatory views of the arrangement of brake pipes or lines 53 that extend toward brake calipers Ca of the left and right rear wheels RW from the master cylinder 52, which is interlocked with a brake pedal 51 disposed in a cabin.

The brake lines 53 are provided in pair in accordance with the brake calipers Ca of the left and right rear wheels RW. The respective brake lines 53 extend parallel to each other toward a rear portion of the vehicle body along an inner surface of the left side frame 15, for example, and pass through the inside of the gusset 17 on a left end of the rear lower cross frame 16 and, thereafter, extend inward in the lateral direction along a front surface of the rear lower cross frame 16.

Thereafter, the respective brake lines 53 are separated from each other in the leftward and rightward directions and are bent upward along a front surface of the rear lower cross frame 16, and are bent rearward along an upper surface of the rear lower cross frame 16. Here, the brake lines 53 pass between the rear lower cross frame 16 and the torsion bar 48a of the stabilizer 48.

The brake line 53 is formed of a metal tube or pipe, for example, and there is a possibility that the brake line 53 will be deformed by receiving a load when the brake line 53 is sandwiched between the drive device 12 and the rear lower cross frame 16 at the time of assembling the vehicle.

To the contrary, the brake lines 53 pass through an area above the rear lower cross frame 16 and below the stabilizer 48 and hence, a possibility that the brake lines 53 will be sandwiched by heavy objects at the time of assembling the vehicle is reduced.

As has been explained heretofore, the vehicle-use pivotally-supporting portion structure according to this embodiment includes: the cylindrical upper pivotally-supporting portion 42; the tubular bushings 45 mounted in the radially inner side of the end portions (small-wall-thickness portions 42a) of the upper pivotally-supporting portion 42, respectively; and the sealing members 46 mounted on the radially outer side of the end portions of the upper pivotally-supporting portion 42 respectively, wherein the flange portion 45b, which extends outward in the radial direction and is brought into contact with the distal end of the upper pivotally-supporting portion 42, is formed on the end portion of the tubular bushing 45, and the outer diameter D1 of the flange portion 45b is set larger than the outer diameter D2 of the end portion of the upper pivotally-supporting portion 42.

Due to such a structure, the sealing member 46 mounted on the end portion of the upper pivotally-supporting portion 42 is caught by the stepped portion 45b1 formed by the flange portion 45b so that the sealing member 46 is minimally removed from the upper pivotally-supporting portion 42. In this manner, by only setting the diameter of the flange portion 45b larger than the diameter of the end portion of the upper pivotally-supporting portion 42, a tendency where the sealing member 46 is easily removed can be suppressed and hence, it is possible to enhance assembling property of the upper pivotally-supporting portion 42 and the surrounding area of the upper pivotally-supporting portion 42 without pushing up a manufacturing cost.

Further, in the above-mentioned vehicle-use pivotally-supporting portion structure, the outer diameter of the flange portion 45b is set larger than the outer diameter of the end portion of the upper pivotally-supporting portion 42 by 0.2 to 0.8 mm.

Due to such a structure, by setting the difference between the tolerance in size of the outer diameter of the flange portion 45b and the tolerance in size of the outer diameter of the end portion of the upper pivotally-supporting portion 42 to approximately ±0.1 mm, a state where the outer diameter of the flange portion 45b is smaller than the outer diameter of the end portion of the upper pivotally-supporting portion 42 is minimally generated and hence, it is possible to ensure catching of the sealing member 46 by forming the stepped portion 45b1 on the end portion of the upper pivotally-supporting portion 42 by the flange portion 45b. Further, by suppressing the diameter of the flange portion 45b from becoming excessively large, it is possible to ensure the ease in mounting of the sealing member 46.

Further, the vehicle 1 adopting the above-mentioned vehicle-use pivotally-supporting portion structure includes: left and right suspension arms (the upper arms 21, the lower arms 31) that support the left and right wheels (rear wheels RW), respectively, and that are swingably supported on the vehicle body frame 10; and the cushion unit 28, which extends between the left and right suspension arms and the vehicle body frame 10, wherein the vehicle body frame 10 includes the arm support portions 26f, 39f, which support the front side of the left and right suspension arms, and the cushion upper support portion 29a, which supports the upper end portion 28a of the cushion unit 28 at the same position as the arm support portions 26f, 39f in the longitudinal direction.

Due to such a structure, in addition to the above-mentioned manner of operation and advantageous effects, the arm support portions 26f, 39f, the cushion upper support portion 29a and the periphery of these portions of the vehicle body frame 10 can be efficiently reinforced by the reinforcing structure disposed at the same position as these portions in the longitudinal direction.

Further, in the above-mentioned vehicle 1, the lower arm 31 that supports the lower end portion 28b of the cushion unit 28 of the suspension arm has the sub arm 36, which projects more frontward than the cushion unit 28 projects.

Due to such a structure, even in the structure where the cushion unit 28 is arranged on the front side of the suspension arm, by providing the sub arm 36 that projects more frontward than the cushion unit 28 projects, pebbles or the like scattered from a road surface minimally hit the cushion unit 28.

Further, the above-mentioned vehicle 1 includes the stabilizer 48, which extends between the left and right suspension arms on the rear lower cross frame 16 of the vehicle body frame 10, and the brake lines 53, which reach the left and right wheels are arranged to pass between the rear lower cross frame 16 and the stabilizer 48.

Due to such a structure, it is possible to suppress a heavy object such as the drive device 12 from coming into contact with the brake lines 53 at the time of assembling a vehicle.

The invention is not limited to the above-mentioned embodiment and, for example, the invention is applicable not only to a four-wheeled vehicle as described above but also to the various other types of vehicles such as a two-wheeled vehicle and a three-wheeled vehicle. Further, the invention is applicable not only to a rear suspension side but also to a front suspension side.

Further, the structure of the above-mentioned embodiment is one example of the invention, and the various modifications such as the replacement of the structural elements of the embodiment with the well-known structural elements are conceivable without departing from the gist of the invention.

DESCRIPTION OF REFERENCE NUMERALS AND SIGNS

1: vehicle
10: vehicle body frame
16: rear lower cross frame (cross member)
21: upper arm (suspension arm)
23f: front upper arm connecting portion (connecting portion)
28: cushion unit
29a: upper end portion (connecting portion)
31: lower arm (suspension arm)
32f: front lower arm connecting portion (connecting portion)
36: sub arm
42: upper pivotally-supporting portion (portion to be pivotally supported)
42a: small-wall-thickness portion (end portion)
D2: outer diameter
45: tubular bushing
45b: flange portion
D1: outer diameter
46: sealing member
48: stabilizer
53: brake line
RW rear wheel (wheel)

What is claimed is:

1. A vehicle-use pivotally-supporting portion structure comprising:
 a cylindrical portion to be pivotally supported;
 a tubular bushing mounted on a radially inner side of an end portion of the cylindrical portion to be pivotally supported; and a sealing member mounted on a radially outer side of the end portion of the cylindrical portion to be pivotally supported, wherein a flange portion, which extends outward in a radial direction and is brought into contact with a distal end of the cylindrical portion to be pivotally supported, is formed on an end portion of the tubular bushing, and an outer diameter of the flange portion is larger than an outer diameter of the end portion of the cylindrical portion to be pivotally supported wherein a stepped portion for the sealing member is formed by the flange portion on the end portion of the cylindrical portion to be pivotally supported.

2. The vehicle-use pivotally-supporting portion structure according to claim 1, wherein the outer diameter of the flange portion is 0.2 to 0.8 mm larger than the outer diameter of the end portion of the cylindrical portion to be pivotally supported.

3. A vehicle comprising the vehicle-use pivotally-supporting portion structure according to claim 2, the vehicle further comprising:

left and right suspension arms that support left and right wheels, respectively, and are swingably supported on a vehicle body frame;

left and right cushion units that extend between the respective left and right suspension arms and the vehicle body frame, wherein connecting portions of the left and right suspension arms to the vehicle body frame and connecting portions of the respective left and right cushion units to the vehicle body frame are approximately arranged on extensions of respective stroke axes of the left and right cushion units as viewed in a plan view.

4. The vehicle according to claim 3, wherein the connecting portions of the suspension arms support a front side of the suspension arms, the connecting portions of the left and right cushion units are arranged on the respective front sides of the respective left and right suspension arms in the same manner as the connecting portions of the suspension arms, and each of the suspension arms has a sub arm that projects more frontward than each of the cushion unit projects.

5. The vehicle according to claim 4, wherein the vehicle includes a stabilizer that extends between the left and right suspension arms above a cross member of the vehicle body frame, and a brake line, which reaches the left and right wheels, is arranged to pass between the cross member and the stabilizer.

6. The vehicle according to claim 3, wherein the vehicle includes a stabilizer that extends between the left and right suspension arms above a cross member of the vehicle body frame, and a brake line, which reaches the left and right wheels, is arranged to pass between the cross member and the stabilizer.

7. A vehicle comprising the vehicle-use pivotally-supporting portion structure according to claim 1, the vehicle further comprising:

left and right suspension arms that support left and right wheels, respectively, and are swingably supported on a vehicle body frame;

left and right cushion units that extend between the respective left and right suspension arms and the vehicle body frame, wherein connecting portions of the left and right suspension arms to the vehicle body frame and connecting portions of the respective left and right cushion units to the vehicle body frame are approximately arranged on extensions of respective stroke axes of the left and right cushion units as viewed in a plan view.

8. The vehicle according to claim 7, wherein the connecting portions of the suspension arms support a front side of the suspension arms, the connecting portions of the left and right cushion units are arranged on the front sides of the respective left and right suspension arms in the same manner as the connecting portions of the suspension arms, and each of the suspension arms has a sub arm that projects more frontward than each of the cushion unit projects.

9. The vehicle according to claim 8, wherein the vehicle includes a stabilizer that extends between the left and right suspension arms above a cross member of the vehicle body frame, and a brake line, which reaches the left and right wheels, is arranged to pass between the cross member and the stabilizer.

10. The vehicle according to claim 7, wherein the vehicle includes a stabilizer that extends between the left and right suspension arms above a cross member of the vehicle body frame, and a brake line, which reaches the left and right wheels, is arranged to pass between the cross member and the stabilizer.

* * * * *